United States Patent [19]

Toyosawa et al.

[11] Patent Number: 5,183,543
[45] Date of Patent: Feb. 2, 1993

[54] POLYANILINES, PROCESS FOR THE PREPARATION THEREOF AND CELLS USING THEM

[75] Inventors: Shinichi Toyosawa, Tokorozawa; Tadashi Nakajima, Tokyo; Kinya Suzuki, Kodaira; Takahiro Kawagoe, Tokorozawa; Tadaaki Miyazaki, Higashiyamato; Takashi Kitamura, Hachioji; Tadashi Fuse, Kodaira; Masao Ogawa, Kawagoe; Yoshitomo Masuda; Hideharu Daifuku, both of Kodaira; Ryota Fujio, Akigawa, all of Japan

[73] Assignee: Bridgestone Corporation, Tokyo, Japan

[21] Appl. No.: 863,527

[22] Filed: May 15, 1986

[30] Foreign Application Priority Data

| May 15, 1985 | [JP] | Japan | 60-103391 |
| May 15, 1985 | [JP] | Japan | 60-103392 |
| May 15, 1985 | [JP] | Japan | 60-103393 |
| Sep. 12, 1985 | [JP] | Japan | 60-202223 |
| Oct. 1, 1985 | [JP] | Japan | 60-218883 |
| Dec. 24, 1985 | [JP] | Japan | 60-296443 |
| Jan. 29, 1986 | [JP] | Japan | 61-17162 |
| Feb. 27, 1986 | [JP] | Japan | 61-43337 |

[51] Int. Cl.⁵ .................. C25B 11/04; C25B 9/00
[52] U.S. Cl. .................. 204/242; 204/290 R; 252/500; 528/422
[58] Field of Search .......... 204/54 R, 242, 290 R; 252/500; 464/434, 435; 528/422

[56] References Cited

U.S. PATENT DOCUMENTS

| 4,547,270 | 10/1985 | Naarmann | 204/59 R |
| 4,559,112 | 12/1985 | Tamamura | 204/59 R |
| 4,566,955 | 1/1986 | Naarmann | 204/59 R |

FOREIGN PATENT DOCUMENTS

| 1519729 | 2/1968 | France |  |
| 1216549 | 12/1970 | United Kingdom |  |
| 2151242 | 12/1985 | United Kingdom | 528/442 |

OTHER PUBLICATIONS

Ohsaka et al. J. Electroanal Chem. 161 (1984) pp. 399–405.
Diaz et al., J. Electroanol Chem 111 (1980) pp. 111–114.
Volkov et al., J. Electrocenol Chem. 115 (1980) pp. 279–291.
Kitani et al. Chem. Abst. 103 (1985) #18577cm.
Buvet et al., Chem. Abst. 87 (1977) #97537m.
Schreiber et al. Chem. Abst. 88 (1978) #1U6848.
Mohilner et al., J. Am. Chem. Soc. 84 (1962) pp. 3618–3622.
Kitani et al., "Performance of Lithium-Polyaniline Storage Batteries", Denki Kagaku oyobi Kogyo Butsuri Kagaku 53 (8), 592 to 596 (1985), Japan.

Primary Examiner—John Niebling
Assistant Examiner—Kathryn Gorgos
Attorney, Agent, or Firm—Oblon, Spivak, McClelland, Maier & Neustadt

[57] ABSTRACT

There is provided a polyaniline having a thickness of 0.3 to 5 mm which is suitable for an electronic material, particularly for an electrode material in a cell. Also provided is a cell comprising a positive electrode, a negative electrode and an electrolyte in which the polyaniline having a thickness of 0.3 to 5 mm is employed in at least one of the positive and negative electrodes, the cell having a high energy density and good cell performance stable for a long period of time.

22 Claims, 2 Drawing Sheets

NUMBER OF REPEATED CYCLES
OF CHARGE AND DISCHARGE

10 μm

POLYANILINES, PROCESS FOR THE PREPARATION THEREOF AND CELLS USING THEM

BACKGROUND OF THE INVENTION

1. Field of the Invention

The present invention relates to a polyaniline (material or film) which may be suitably used as an electronic material, particularly as an electrode material in a cell, photoelectric cell and the like, a process for the preparation of such a polyaniline, and a cell using it.

2. Description of the Prior Art

Recently, various studies of secondary cells using an electroconductive polymer as an electrode active material have been made in order to lighten the weight of such a cell. Among such cells, in particular, a secondary cell using a polyaniline as an electrode active material is known as a "conductive polymer cell" having good charge-discharge efficiency.

However, all the conventional cells using a polyaniline electrode were of laboratory scale and far from practical. The major reason is, according to the findings of the present inventors, that the thickness of such a polyaniline electrode formed on a current collector of platinum or the like was at most on the order of tens of microns.

In order to provide a practically available spiral or laminated electrode, it is necessary to form a polyaniline film having a thickness of the order of a few millimeters. However, such a thick film of polyaniline could scarcely have been provided.

Polyanilines for use as cell electrodes are generally prepared by oxidative polymerization of aniline in an aqueous acidic solution such as sulfuric acid etc.; while on the other hand a polyaniline synthesized in an alkaline solution is electrochemically inactive and cannot be utilized as an active material for a cell.

The oxidative polymerization of aniline is carried out either by using a chemically oxidizing agent such as persulfuric acid or by electrolytic oxidation.

In chemical oxidation, polyanilines are usually produced in a powdery form. The polyanilines should be used to form an electrode integrated with a collector, for example, by applying the polyaniline powder onto the collector and pressing, or by mixing the polyaniline powder with a binder and applying the resulting paste on the collector. Such an electrode is inferior to that of the polyaniline prepared by electrolytic oxidation with respect to the productivity, and energy density (discharge current and voltage), etc..

In electrolytic oxidation or polymerization, on the other hand, polyanilines are produced on an anode in the form of a film, and the whole polyaniline film can effectively be utilized as an electrode. Further, such an electrode has a low internal resistance, and therefore, the voltage decrease will be small. Thus, the electrode using the polyaniline prepared by the electrolytic polymerization will give a high energy density and is preferred for an electrode of a cell.

As stated previously, however, only thin films on the order of tens of microns have heretofore been provided even in electrolytic polymerization, since a film of polyaniline produced on an anode becomes brittle as the film thickness increases.

SUMMARY OF THE INVENTION

It is an object of the present invention to provide a polyaniline film having a sufficient thickness to be used as an electronic material for a practical cell electrode, etc., as well as the electronic properties required for such an electronic material.

Another object of the present invention is to provide a process for preparing a polyaniline film having such properties.

It is still another object of the present invention to provide a cell having a high energy density and exhibiting good cell performance stable for a long period of time, by employing such a polyaniline as an electrode.

According to the present invention, there is provided a polyaniline having a thickness of 0.3 to 5 mm.

The polyaniline film of the present invention is a film of 0.3 to 5 mm in thickness; nevertheless, it is excellent in its film performance. For example, it has no pinholes. It is also tough and flexible. Moreover, the polyaniline film has excellent electronic properties; for example, a cell having good charging capacity and Coulomb efficiency can be provided when the film is used as an electrode material of the cell. Accordingly, the polyaniline film may be useful for an electronic material, such as an electrode material, a color switching element, a photoelectric conversion element, an electromagnetic wave shielding material, an antistatic material and the like.

In particular, when the polyaniline film of the present invention is employed as a positive and/or negative electrode of a cell, there can be provided a secondary cell which has a high energy density, that is, an excellent charge capacity and Coulomb efficiency as stated above, and good cell performance stable for a long period. Such a cell can be charged and discharged repeatedly and, thus, have a long cell life. Moreover, owing to the properties of polyaniline such as the flexibility and the lower weight, as compared with inorganic or metallic materials, smaller, thinner and/or lighter cells can be made. Thus, small cells such as button cells and cylindrical cells may also be constructed by using such a polyaniline film. These cells may, therefore, be suitable for many applications such as automobiles, airplanes, portable instruments, computers, and the like.

According to a preferred embodiment of the present invention, there is provided a polyaniline which is subjected to a reduction and/or alcohol treatment. Cells having a highly increased discharge capacity can be provided by using such a polyaniline.

In another embodiment of the present invention, there is provided a polyaniline insoluble in dimethylformamide which is obtained by dipping a polyaniline into dimethylformamide to dissolve and remove dimethylformamide-soluble portions thereof. When such a polyaniline is used in at least one of the positive and negative electrodes to construct a cell, there is provided cells excellent in durability, for example, secondary cells having a highly excellent cycle life and voltage withstanding property.

According to a still another preferred embodiment of the present invention, there is provided a polyaniline having a bulk density of 0.4 to 1.1 g/cm$^3$ which is obtained by pressing a polyaniline. When such a polyaniline is used as at least one of the positive and negative electrodes to form a cell, the amount of electrolyte required to operate such a cell efficiently can be greatly reduced. For example, such a cell can be operated efficiently even if the amount of the electrolyte, which is usually 3 to 4 ml or more per g of polyaniline, is reduced to 0.5 to 2 ml. Thus, a cell of lighter weight and higher performance as compared with conventional cells may be provided.

BRIEF DESCRIPTION OF THE ACCOMPANYING DRAWINGS

The above and other objects, features and advantages of the present invention will be more clearly understood by the following description with reference to the accompanying drawings, in which.

DETAILED DESCRIPTION OF THE INVENTION

The polyaniline film according to the present invention has a thickness of 0.3 to 5 mm. When a polyaniline of less than 0.3 mm in thickness is used as an electrode, a collector in the resulting cell will be large relative to the electrode, and the excellent properties of polyanilines cannot be effectively utilized. On the other hand, when a polyaniline thicker than 5 mm is used as an electrode material of a cell, problem of electronic materials occur; for example, the power density of the cell may be reduced.

The polyaniline film of 0.3 to 5 mm in thickness of the present invention is suitably prepared by electrolytic oxidative polymerization. The preparation of the polyaniline by the electrolytic oxidative polymerization is preferably carried out in a borofluoric acid solution at a current density of about 50 mA/cm$^2$ or lower, especially about 30 mA/cm$^2$ or lower, and a temperature of $-10°$ to $30°$ C., especially $-5°$ to $20°$ C. Preferably, the concentration of borofluoric acid is 0.1 to 4 mol/l, especially 0.5 to 3 mol/l. The concentration of aniline is preferably 0.05 to 5 mol/l, especially 0.25 to 1.5 mol/l. The lower limit of the current density is not limited, but usually is 0.1 mA/cm$^2$, particularly 1 mA/cm$^2$.

Thus, in the preparation of polyanilines by electrolytic polymerization, a polyaniline film of 0.3 to 5 mm in thickness having good film formability and flexibility may be well obtained when the above described conditions are utilized: that is, i. the electrolytic polymerization is carried out in a borofluoric acid solution;

ii. the current density in the electrolytic polymerization is about 50 mA/cm$^2$ or lower, preferably 30 mA/cm$^2$ or lower; and iii. the temperature in the electrolytic polymerization is in the range of from $-10°$ C. to $30°$ C., preferably in the range of from $-5°$ C. to $20°$ C.

Generally, electrolytic polymerization of aniline has been carried out in an aqueous solution of sulfuric or hydrochloric acid. In such a conventional polymerization method, however, the polyaniline film produced will become brittle when the film thickness is more than several tens micrometers. Such a polyaniline film may peel off from the anode, or pinholes may be formed in such a film.

On the contrary, when electrolytic polymerization is carried out under the above conditions, that is, in a borofluoric acid solution at a current density of about 50 mA/cm$^2$ or lower and a temperature in the range of from $-10°$ C. to $30°$ C., a tough and flexible polyaniline film can be formed with a film thickness of 0.3 to 5 mm and peeling off of the film from the anode and/or the formation of pinholes in the film does not occur. Further, such a polyaniline film also provides good electronic properties required for electronic materials; thus, cells excellent in their charge capacity and Coulomb efficiency can be obtained when the film is employed as the electrode material of the cells.

Figure 1:
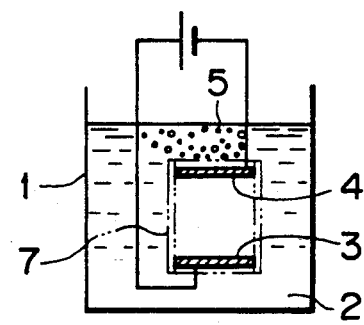
FIG. 1 is a schematic drawing showing an apparatus for preparing the polyaniline of the present invention.

The electrolytic oxidation polymerization for preparing the polyaniline as described above is preferably performed by using an apparatus as shown in FIG. 1, wherein an electrolytic cell 1 contains an electrolytic solution 2 in which an anode 3 and a cathode 4 are each disposed approximately horizontally with the anode 3 being lower than the cathode 4. When an electric current is applied to the electrodes to effect electrolytic oxidation, polyaniline is deposited to form a film on the surface of the anode.

By using such an apparatus, an polyaniline can be obtained with excellent film formability while its electronic properties are not adversely affected. Thus, a polyaniline film having a uniform film thickness can be formed without formation of pinholes or cracks.

The anode and cathode may be made in the form of a plate or the like. Preferably, the cathode is a mesh or any other gas permeable form. Gases 5 generated under such a permeable cathode will pass through the cathode and further ascend smoothly in the electrolytic solution. Therefore, partial cohesion and accumulation of the gases generated beneath the cathode as well as perturbation of the current density on the anode will effectively be prevented, and thus uniform films of polyaniline are certainly obtained. Further, it is preferred to vibrate the cathode so that better removal of gases from the cathode may be attained.

Preferably, the following conditions for such an apparatus and the operation may also be adopted:

(a) the size of the cathode is approximately the same as that of the anode in order to uniformize the current density on the anode plate;

(b) the distance between the cathode and the anode is large; and (c) the electrolytic solution is not agitated since such agitation may cause the generation and/or increase of floating polymers.

Thus, homogeneous polyaniline films having a more uniform thickness can thereby be obtained.

Figure 2:
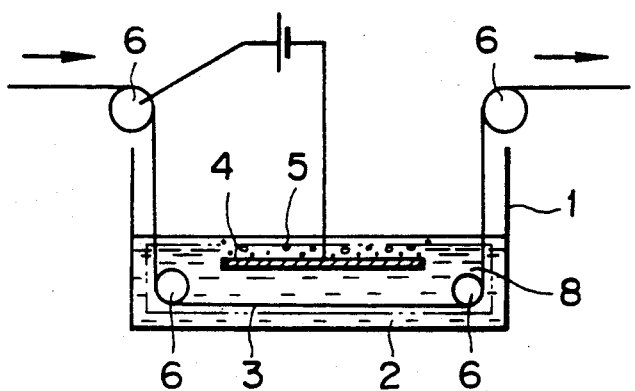
FIG. 2 is a schematic drawing illustrating another apparatus for preparing the polyaniline of the present invention.

Moreover, electrolytic oxidative polymerization can also be carried out in an apparatus as shown in FIG. 2 in which a long sheet anode 3 placed under tension between rollers 6 is continuously or intermittently stretched at a given speed in the direction as shown in FIG. 2 by an arrow. Thus, a homogeneous polyaniline film having a uniform thickness can continuously be prepared without pinholes or cracks. In the apparatus, an electric current is applied to one of the rollers 6.

In the apparatus as shown in FIG. 1, a cylindrical frame 7 can be disposed between the anode 3 and the cathode 4 so that the inner periphery of the lower part of the frame may be arranged in contact with or in close vicinity to the periphery of the anode 3, as shown by two-dot chain lines. Alternatively, in FIG. 2, plate frames 8 can be disposed between the anode 3 and the cathode 4 so that each frame may be contacted with each side of the anode 3, as shown by a two-dot chain line. This prevents the concentration of the current at the periphery or sides of the anode 3 as effectively as possible. Therefore, polyaniline may be electrodeposited uniformly on the anode. In this instance, the upper part of the frame may be separated from and below the cathode.

When polyanilines are prepared by electrolytic oxidative polymerization, materials for anodes and cathodes which may be used are not particularly limited but any material which is insoluble in an electrolytic solution and conductive during the electrolysis may be utilized. Such materials include, for example, metallic materials such as Pt, Au, Pd, $PbO_2$ etc. and graphite, as well as those of these materials which can be deposited on a film or glass by vacuum evaporation, sputtering, coating or the like.

In particular, an anode made of a carbonaceous material is preferably used during electrolytic polymerization. When the polyaniline is deposited on a carbonaceous thin layer, a composite of the polyaniline and the carbonaceous material may be formed and such a composite will have additional characteristics: the electrical contact between the polyaniline and the carbonaceous thin layer is excellent; such a composite is light in weight and has good flexibility; such a composite can easily be made into a spiral form; and a cylindrical cell or the like can be easily formed by using such a composite as an electrode. Accordingly, such polyanilines bonded to and formed on a carbonaceous thin layer are suitable for electronic materials.

Such carbonaceous thin layers are preferably those of flexile carbonaceous materials having a thickness of 0.01 to 500 $\mu$m, particularly 0.1 to 100 $\mu$m. Carbonaceous materials may be amorphous carbon or graphite. However, the latter is preferably used in the preparation of the polyaniline by the electrolytic polymerization, since polyaniline films useful as an anode can be formed and graphite has a low electric resistance when used as a collector in a cell.

Methods for forming a flexible carbonaceous thin layer are not necessarily limited, and vacuum deposition of a carbonaceous material on a flexible film or the like, application of a carbonaceous coating material on a flexible film or the like, or other methods may be utilized. Preferably, the "expanded graphite", which is prepared by intercalating sulfuric acid or the like into an artificial or natural graphite and heating to expand, is compression molded to form a thin layer, or a thin layer is cut out from the moldings of the expanded graphite. These are good, flexible thin layers and composites of these thin layers integrated with polyanilines are flexible. Thus, a cylindrical cell can be prepared by shaping the composite into a spiral electrode.

The polyaniline of the present invention may be subjected to a reduction and/or alcohol treatment. Such a polyaniline is preferred for an electronic material since a larger discharge capacity can be attained, particularly when such a polyaniline is employed as an electrode material of a cell or the like.

The reduction treatment may be carried out by electrolytic and/or chemical reduction.

During the electrolytic reduction, a polyaniline film is used as a cathode is subjected to electrolysis while dipping it into a solution of an acid, such as borofluoric acid, hydrochloric acid, perchloric acid, sulfuric acid, phosphoric acid, nitric acid and the like, or a salt thereof. It is advantageous to apply a reverse potential lower than the potential required to prepare a polyaniline in the electrolytic polymerization described above. The current density is preferably in the range of from 0.1 to 80 $mA/cm^2$, particularly 1 to 5 $mA/cm^2$. For example, it is preferred to reduce a polyaniline at a constant current of 1 $mA/cm^2$ to about 0.30 to 0.42 C/mg. The period of time for the electrolysis is preferably 3 to 2,500 minutes, particularly about 50 to 250 minutes. Further, the temperature of the electrolytic solution used in the reduction is usually room temperature, although the solution may optionally be heated.

In chemical reduction, for example, a polyaniline film may be exposed to a reductive environment such as hydrogen gas, or dipped into a solution containing a reducing agent such as hydrazine. Preferably, a polyaniline is dipped into a 5-20% aqueous hydrazine solution. The period of time for the chemical reduction is preferably 10 to 1,500 minutes, particularly 180 to 720 minutes.

For the treatment of a polyaniline with an alcohol, any method capable of carrying out mutual contact between a polyaniline and an alcohol may utilized: for example, dipping a polyaniline into an alcohol-containing liquid; exposure of the polyaniline to an alcohol vapor; spraying an alcohol to a polyaniline; or any other method. Advantageously, a polyaniline is dipped into a liquid containing an alcohol at a temperature of 10° to 40° C., particularly 15° to 30° C., for 5 minutes to 24 hours, particularly 30 minutes to 2 hours.

Alcohols which may be used include aliphatic alcohols, such as methanol, ethanol, propanol, butanol, pentanol, hexanol, heptanol, ethylene glycol, glycerin and the like; aromatic alcohols, such as benzyl alcohol and the like; derivatives of these alcohols; and any other compounds containing an alcoholic hydroxyl group. The alcohol-containing liquid may be a liquid containing one or more alcohols as described above, a high purity alcoholic liquid comprising one or more alcohols, or a mixed solution of an alcohol with water, acetone, diethyl ether, toluene or any other solvent. Preferably, it contains 30% by weight or more, particularly 85% by weight or more, of an alcohol. The high purity alcoholic liquids of one or more aliphatic alcohols, especially methanol, ethanol or a mixture thereof, are preferably used.

Either one of the reduction and alcohol treatments or both treatments may be carried out. However, it is preferred to effect both treatments with respect to the discharge capacity when the polyaniline is used as an electrode material of a cell. These treatments may be performed separately or, alternatively, both treatments may simultaneously be performed by carrying out the electrolysis in an alcohol-containing liquid. When these are separately carried out, the reduction is preferably carried out prior to the alcohol treatment although the alcohol treatment may precede the reduction. Most preferably, the electrochemical reduction is first performed and followed by the chemical reduction and/or alcohol treatment. In particular, the electrochemical reduction, the chemical reduction and the alcohol treatment are sequentially performed in this order.

Figure 3:
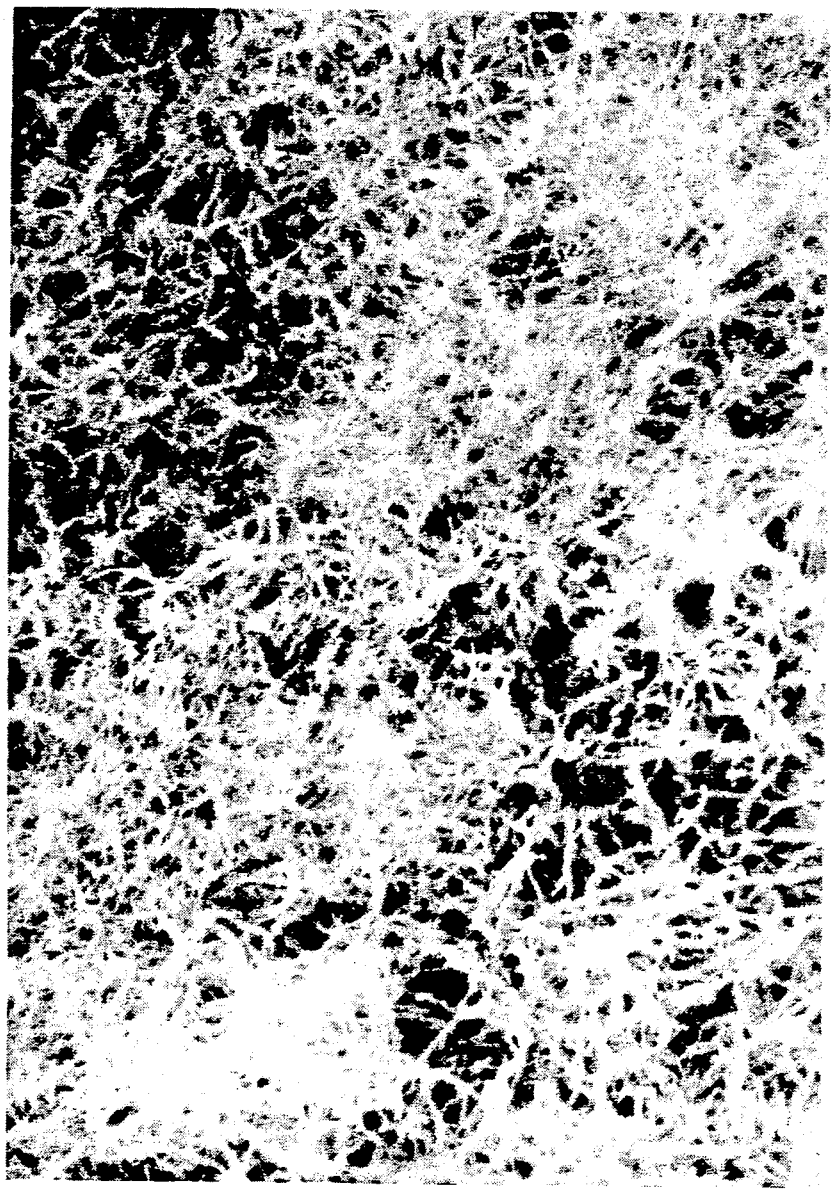
FIG. 3 is an electron microscopic photograph of an example of the polyaniline according to the present invention.

The polyaniline of the present invention preferably has a fibrous structure (fibril structure) in which fibers are randomly tangled with each other as shown in FIG. 3. Preferably, the fibers have a diameter of 0.4 μm or less. Such polyanilines exhibit excellent properties for electronic materials; for example, the cell discharge capacity can be increased when they are used as an electrode material of a cell, or the like.

Such fibrous polyanilines may be prepared by subjecting aniline to electrolytic oxidation in an electrolytic liquid containing borofluoric acid. In particular, polyanilines having a fibrous structure of 0.4 μm or less in fiber diameter may effectively be prepared by subjecting a polyaniline obtained from a polymerization liquid containing borofluoric acid to reduction followed by chemical reduction, and then treating the polyaniline with an alcohol.

Polyanilines obtained by chemical oxidation using a persulfate salt or the like or by electrolytic oxidation using a polymerization liquid containing an acid such as phosphoric acid, sulfuric acid, perchloric acid are in a cluster or dendrite form and not fibrous.

Preferably, the polyaniline of the present invention is insoluble in dimethylformamide. Such polyanilines are obtained by dipping a polyaniline into dimethylformamide to dissolve and remove soluble portions thereof in dimethylformamide. The dimethylformamide-insoluble polyanilines are preferred since they are excellent in initial properties such as conductivity, electrochemical activity and the like as well as durability. In particular, when such a polyaniline insoluble in dimethylformamide is used as a positive or negative electrode, a secondary cell excellent in a cycle life and voltage withstanding property and having a highly increased discharge capacity can be provided.

In this connection, polyanilines obtained by electrolytic oxidative polymerization of aniline will have anions doped therein. Preferably, the portions soluble in dimethylformamide of such a polyaniline are effectively removed after the anions doped therein have been removed therefrom, in order to obtain higher durability.

Furthermore, the polyaniline of the present invention preferably has a bulk density of 0.4 to 1.1 g/cm$^3$. Such a polyaniline has excellent properties for electronic materials: for example, when it is used as an electrode material of a cell, the amount of an electrolyte used in the cell can be reduced, the weight of the cell can be decreased, and the discharge capacity can be increased.

Generally, polyanilines obtained by electrolytic oxidative polymerization will have a lower bulk density. According to the present invention, the polyaniline having a bulk density of 0.4 to 1.1 g/cm$^3$ may be produced by pressing such a polyaniline of lower density.

Polyanilines are preferably pressed in the wet state; that is, polyanilines impregnated with a solvent or an electrolytic solution may preferably be pressed, although a dry polyaniline material can also be pressed. The pressing may be performed in a continuous or batch-wise manner. When polyanilines are prepared by electrolytic polymerization, the polyaniline may directly be pressed together with the anode on which the polyaniline film has been deposited.

The pressure which applied to the polyaniline having a bulk density of 0.15–0.25 g/cm$^2$ is usually 30 to 500 kg/cm$^2$, preferably 50 to 300 kg/cm$^2$ to obtain the polyaniline having a bulk density of 0.4 to 1.1 g/cm$^3$.

The thickness of the polyaniline having a bulk density of 0.4 to 1.1 g/cm$^3$ is preferably 0.1 to 3 mm, particularly 0.3 to 2 mm, although the thickness will vary with the compressibility of the polyaniline and other factors.

Pressed polyaniline materials obtained by compression molding a polyaniline material which is impregnated with a solvent component to be used in an electrolytic solution of a cell or a liquid comprising an electrolyte and solvent components to be used as an electrolytic solution of a cell are particularly preferred for electrode materials in cells. When such a pressed polyaniline material is employed as an electrode material of a cell, the amount of an electrolyte in the cell may be reduced; such a cell can be miniaturized and lightened; a small-sized cell such as a coin-type secondary cell and the like may easily be made; the moldability of an electrode essential for the preparation of the cell is good; such a cell has high cell performance such as a high discharge capacity and a high energy density from the beginning of operation of the cell; and such cell performance is stable and hardly changes in the course of operation.

When a polyaniline impregnated with a solvent component is to be used in an electrolytic solution of a cell, or a liquid comprising an electrolyte and solvent components is to be used as an electrolytic solution of a cell, is press molded, the amount of the solvent or liquid to be impregnated is not especially limited but preferably is ¼ or more, particularly from ½ to equal volume, of the volume of the polyaniline before press molding. For example, a dried polyaniline material is preferably dipped into an impregnating liquid for about 1 to 2 minutes so that the polyaniline material is impregnated with the same volume of the liquid as the material, pressed and molded into a predetermined shape, and the dripping, excess liquid is wiped out.

The impregnating liquid is either a solvent to be used in an electrolytic solution of a cell or a liquid which is comprised of an electrolyte and a solvent and will be used as an electrolytic solution of a cell. Such a solvent and electrolyte components are not necessarily the same as those to be actually used to prepare a cell using the resulting pressed material, so long as they may be used in an electrolytic solution of a cell. The concentrations of the components in the impregnating liquid may also be different from those in an actual electrolytic solution to be used in the preparation of a cell. However, the same solvent or a liquid comprising the same electrolyte and the same solvent as an electrolytic solution to be used in the preparation of a cell by using the resulting pressed material is preferably used, and just or approximately the same concentrations of the components as those in an electrolytic solution to be used are preferred.

When such a polyaniline having a bulk density of 0.4 to 1.1 g/cm$^3$ obtained by pressing is used as a positive and/or negative electrode of a cell, the amount of an electrolyte required for effective operation of the cell can be greatly reduced. Even if the amount of an electrolyte, which is generally 3 to 4 ml or more per g of polyaniline, is reduced to 0.5 to 2 ml per g of polyaniline, such a cell may efficiently be operated. Thus, a cell which has a lighter weight as compared with conventional cells as well as high performance such as an excellent discharge capacity can be obtained.

The polyanilines of the present invention may preferably be employed as electrode materials of cells, particularly secondary cells. The polyaniline can be used as either the positive or negative electrode. Thus, either one or both positive and negative electrodes can be made of the polyaniline of the present invention.

When polyaniline is used as a positive electrode, various electrode materials may be utilized for a negative electrode of the cell according to the present invention. However, the negative electrode materials are preferably those which contain an active material incorporating cations in the charged state (reduced state) and releasing the cations in the discharged state (oxidized state) and thus are capable of reversibly exchanging cations with an electrolyte.

Such materials for negative electrodes are preferably those substances having a highly conjugated bond in a molecule and include polynuclear aromatic compounds such as anthracene, naphthalene, tethracene and the like, as well as polyanilines similar to those used in the positive electrode of the cell according to the present invention and other organic conductive polymer materials. Organic conductive polymer materials which may be used include, for example, polyacetylene; polymers of benzene and derivatives thereof, such as polybenzene, poly-p-phenylene, polyaniline and the like; polymers of hetero- or polynuclear aromatic compounds, such as polypyridine, polythiophene, polyfurane polypyrrole, polymers of anthracene or naphthalene, and the like; and pressed products thereof. Graphite materials are also preferred.

Metals capable of being converted into cations may also be used for negative electrode materials; for example, lithium, sodium, potassium, magnesium, calcium, barium, zinc, aluminum, etc., or alloys thereof may preferably be used since they give a high cell voltage. Lithium metal and lithium alloys are particularly preferred.

Lithium alloys which may be used in the negative electrode of the cell according to the present invention include those obtained by heating and melting a metal capable of being alloyed with lithium, e.g., aluminum, silver, lead, tin, bismuth, indium, cadmium, zinc, antimony, thallium, magnesium or the like, or an alloy of two or more of these metals under vacuum or inert gas environment to mix homogenously together with lithium and then cooling and solidifying the mixture to prepare a lithium alloy; and those prepared by electrochemically introducing lithium into such a metal or alloy as described above. The composition of such an alloy, the amount of a negative electrode active material, and the like are not especially limited.

Lithium alloys obtained electrochemically by using an electrolytic solution having a stable region at a potential of 1.2 V or lower vs. Li/Li$^+$ may be preferred. In particular, preferred lithium alloys may be prepared by using an electrolytic solution which comprises at least one electrolyte selected from LiClO$_4$, LiCF$_3$SO$_3$ and LiPF$_6$ and at least one solvent selected from propylene carbonate, tetrahydrofuran, dimethoxyethane, $\gamma$-butyrolactone, dioxolan, hexamethylphosphoramide, sulfolane, dimethylsulfoxide, and dimethylformamide.

Such lithium alloys include Li-Al, Li-In, Li-Bi-Pb, Li-Bi-Pb-Cd, Li-Sn-Pb, Li-Sn-Sb-Cd, Li-Sn-Cd, Li-Sn-Pb-Zn, Li-Bi-Pb-Mg and Li-Sn-Bi-Mg.

When the polyaniline according to the present invention is used in a negative electrode of a cell, the positive electrode materials may be any of such organic conductive materials as described above, pressed products thereof, graphite materials, or the like. Also usable for positive electrode materials may be, for example, metal oxides such as TiO$_2$, PbO$_2$, Cr$_2$O$_3$, V$_2$O$_5$, V$_6$O$_{13}$, MnO$_2$, CuO, MoO$_3$, Cu$_5$V$_2$O$_{10}$, etc., metal sulfides such as TiS$_2$, FeS, CuCoS$_4$, MoS$_3$, etc., metal selenides such as NbSe$_3$, VSe$_2$, etc., or the like.

Electrolytes which may be used in the cell of the present invention are compounds comprising a combination of an anion and a cation. Illustrative examples of the anions may be halide anions of group VA elements, such as PF$_6^-$, SbF$_6^-$, AsF$_6^-$, and SbCl$_6^-$, halide anions of group IIIA elements, such as BF$_4^-$ and AlCl$_4^-$, halogen anions, such as I$^-$ (I$_3^-$), Br$^-$ and Cl$^-$, perchlorate anion such as ClO$_4^-$, HF$_2^-$, CF$_3$SO$_3^-$, SCN$^-$, SO$_4^{2-}$, HSO$_4^-$ or the like, but are not limited to these anions. Illustrative examples of the cations may be alkali metal ions such as Li$^+$, Na$^+$ and K$^+$, alkaline earth metal ions such as Mg$^{2+}$, Ca$^{2+}$ and Ba$^{2+}$, as well as Zn$^{2+}$, Al$^{3+}$, H$^+$, quarternary ammonium ions such as R$_4$N$^+$ where R represents hydrogen or a hydrocarbon radical, or the like, but are not limited to these cations.

Illustrative examples of the electrolytes comprising such an anion and cation include LiPF$_6$, LiSbF$_6$, LiAsF$_6$, LiClO$_4$, LiI, LiBr, LiCl, NaPF$_6$, NaSbF$_6$, NaAsF$_6$, NaClO$_4$, NaI, KPF$_6$, KSbF$_6$, KAsF$_6$, KClO$_4$, LiBF$_4$, LiAlCl$_4$, LiHF$_2$, LiSCN, ZnSO$_4$, ZnI$_2$, ZnBr$_2$, Al$_2$(SO$_4$)$_3$, AlCl$_3$, AlBr$_3$, AlI$_3$, KSCN, LiSO$_3$CF$_3$, H$_2$SO$_4$, HCl, H$_3$PO$_4$, (n-C$_4$H$_7$)$_4$NAsF$_6$, (n-C$_4$H$_7$)$_4$NPF$_6$, (n-C$_4$H$_7$)$_4$NClO$_4$, (n-C$_4$H$_7$)$_4$NBF$_4$, (C$_2$H$_5$)$_4$NClO$_4$, (n-C$_4$H$_7$)$_4$NI, etc. One or more electrolytes selected from LiClO$_4$, LiBF$_4$, LiPF$_6$ and LiAsF$_6$ are particularly preferred.

Such electrolytes are generally used as a solution thereof dissolved in a solvent. The solvent is preferably relatively highly polar, and includes propylene carbonate, ethylene carbonate, benzonitrile, acetonitrile, tetrahydrofuran, 2-methyltetrahydrofuran, $\gamma$-butyrolactone, triethyl phosphate, triethyl phosphite, dimethyl sulfate, dimethylformamide, dimethylacetamide, dimethylsulfoxide, dioxane, 1,3-dioxolan, dimethoxyethane, polyethylene glycol, sulfolane, dichloroethane, chlorobenzene, nitrobenzene, water, etc., and mixtures thereof. Particularly preferred is propylene carbonate, $\gamma$-butyrolactone, dimethoxyethane, tetrahydrofuran or any mixture thereof.

The amount of the electrolytic solution is not particularly limited. When the pressed polyaniline of the present invention having a bulk density of 0.4 to 1.1 g/cm$^3$ is utilized, the amount is less than usual, and may be 3 ml or less, particularly 0.5 to 2 ml, per g of the pressed material.

For the electrolyte used to construct the cell of the present invention, there can also be utilized an organic solid electrolyte, such as a polymer, for example, polyethyleneoxide, polypropyleneoxide, polyethyleneoxide crosslinked with isocyanate, phosphazen polymer having ethylene oxide side chain, etc., which is impregnated with one or more electrolytes as described above; an inorganic ionic conductor, such as Li$_3$N, LiBCl$_4$, etc.; or an inorganic solid electrolyte, for example, lithium glass such as Li$_4$SiO$_4$, Li$_3$BO$_3$ etc., or the like.

When a non-aqueous electrolytic solution is used to construct a cell having a high cell voltage according to the present invention, the water content of the non-aqueous electrolytic solution is preferably as low as possible; preferably, the water content in such a non-aqueous electrolytic solution is 50 ppm or lower, particularly 10 ppm or lower.

The cell of the present invention generally contains an electrolytic solution placed between a positive and negative electrodes. A porous membrane of a synthetic resin such as polyethylene, polypropylene and the like, a natural fiber paper, or the like can optionally be used as a separator disposed between the positive and negative electrodes.

The present invention will be illustrated by the following examples including comparative examples. These examples should not be construed as limiting.

EXAMPLE 1

A commercially available expanded graphite was scattered on a film of polyvinyl chloride and pressed at 50 to 200 kg/cm$^2$. There was obtained a flexible film having a conductive, thin graphite layer of 20 $\mu$m.

Aniline was subjected to electrolytic polymerization by using the flexible film, 5 cm × 10 cm, having a graphite layer as an anode and a lead plate, 5 cm × 10 cm, as a cathode. An aqueous solution (0.5 l) containing 1 mol/l of aniline and 2 mol/l of HBF$_4$ was subjected to electrolytic polymerization at 0° C. and a constant current of 20 mA/cm$^2$ for one hour.

A film of polyaniline having a thickness of 1.3 mm and good film formability was obtained which was integrated with the graphite layer. The polyaniline film was flexible and could be molded into a spiral together with the graphite layer after drying. Further, impregnation of the film with propylene carbonate facilitated the molding.

A charge-discharge test was then performed using the flexible polyaniline film as a positive electrode, the graphite integrated with the film as a collector, lithium metal as a negative electrode, and propylene carbonate containing 1 mol/l of LiClO$_4$ as an electrolytic solution. The charge-discharge capacity was 123 AH per kg of polyaniline at a discharge current of 0.8 mA/cm$^2$ in a voltage range of 2.0 to 4.0 V, and the Coulomb efficiency was 97%. The cell performance remained good without any decrease even after 200 cycles.

EXAMPLE 2

A platinum plate as an anode and a #30 stainless steel mesh as a cathode were disposed in an electrolytic cell such that both electrodes were horizontal and the anode was separated by a given distance from and below the cathode, as shown in FIG. 1. An aqueous solution containing 1 mol/l of aniline and 2 mol/l of HBF$_4$ was subjected to electrolytic oxidative polymerization at the solution temperature of 20° C. and a constant current density of 10 mA/cm$^2$ for 2 hours. Thus, polyaniline was deposited on the surface of the anode.

The resultant polyaniline was observed. It had a uniform thickness of 1.6 mm but neither crack nor pinhole was observed. It was flexible and had good quality.

EXAMPLE 3

A #30 stainless steel mesh of 6 cm × 7 cm in size as an anode and a #30 stainless steel mesh of 6 cm × 7 cm in size as a cathode were disposed in an electrolytic cell such that both electrodes were horizontal and the anode was placed lower by a given distance than the cathode, as shown in FIG. 1. Further, a tubular frame of an acrylic resin was arranged so that its inner periphery was contacted with the outer periphery of the anode, as shown in FIG. 1.

An aqueous solution containing 1 mol/l of aniline and 2 mol/l of HBF$_4$ was subjected to electrolytic oxidative polymerization in the electrolytic cell at the solution temperature of 20° C. and a constant anode current density of 10 mA/cm$^2$ for 2 hours. Thus, polyaniline was deposited to form a sheet having the thickness of about 1.2 mm on the surface of the anode.

Thirty specimens of 1.8 cm$^2$ in area were cut out equally from the peripheral and central portions of the resultant polyaniline sheet. The weight of each specimen was measured. The average weight was 55.6 mg with a standard deviation of 2.05 mg.

EXAMPLE 4

A flexible polyvinyl chloride film on which carbon had been deposited by vacuum evaporation in a thickness of 4 $\mu$m was used as an anode (collector). Electrolytic polymerization of aniline was carried out as in Example 1 to obtain a flexible polyaniline film integrated with the carbon collector. The thickness of the polyaniline film was 1.1 mm. The integrated film of the polyaniline film with the carbon collector could be formed into a spiral.

A charge-discharge test of the integrated film was carried out in a similar manner to Example 1. The discharge capacity was 116 AH per kg of polyaniline and the Coulomb efficiency was 98%. The cell did not deteriorate even after 200 cycles.

EXAMPLE 5

A solution comprising 5 cc of aniline, 15 cc of 12N hydrochloric acid and 30 cc of ion exchange water was added into an electrolytic cell which was provided with a working electrode and a counter electrode, each being a platinum plate having an area of 4 cm$^2$. Electrolytic polymerization of aniline was carried out at a constant current of 20 mA for 1.4 hours. A reverse current of 4 mA was then applied for one hour to remove negative ions doped in the polymer. The resultant polymer was washed with water and dried under vacuum to give about 40 mg of polyaniline.

The polyaniline was dipped in 50 cc of dimethyl formamide to elute dimethylformamide-soluble portions. The resultant polyaniline insoluble in dimethylformamide was separated and dried under vacuum. Thus, 34 mg of polyaniline insoluble in dimethylformamide was obtained.

A cell was constructed using the polyaniline insoluble in dimethylformamide as an electrode plate of the cell, a lithium counter electrode, and an electrolytic solution of 1 mol/l LiBF$_4$/propylene carbonate.

The discharge electric capacity of the cell was measured every 24 hours while the potential of the polyaniline electrode plate was fixed at 4 V relative to Li. The results of oxidative deterioration are shown in FIG. 4, in which the abscissa represents the number of repeated cycles of charge and discharge and the ordinate represents the discharge capacity in Ah/kg.

Figure 4:
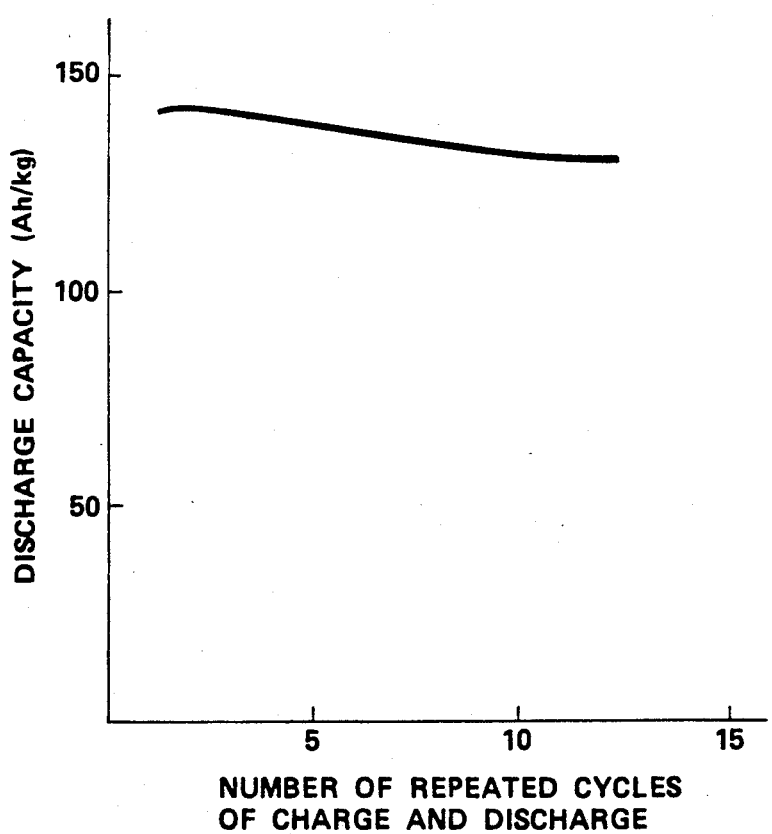
FIG. 4 is a graph showing the variation of the discharge capacity with repeated cycles of charge and discharge in a secondary cell prepared by using the polyaniline of the present invention as an electrode material.

As seen from FIG. 4, it was found that the cell comprising an electrode of polyaniline insoluble in dimethylfomamide had excellent durability.

EXAMPLE 6

A solution for electrolysis comprising 5 cc of aniline, 15 cc of 42% HBF$_4$ and 30 cc of ion exchange water was added to an electrolytic cell provided with a working electrode and a counter electrode, each being made of a platinum plate having an area of 4 cm$^2$. Electrolytic polymerization was conducted at a constant current of 20 mA for 1.4 hours to give polyaniline.

The polyaniline was then treated in the solution described above at a reverse current of 4 mA for one hour to electrochemically reduce the polyaniline. Subsequently, the treated polyaniline was dipped into a 10% aqueous solution of hydrazine monohydrate as a reducing agent for 12 hours. The resultant polyaniline was then dipped into methanol for 12 hours and dried under vacuum. There was obtained about 36 mg of polyaniline (0.8 mm).

A cell was constructed by using the obtained polyaniline as an electrode plate of the cell, lithium counter electrode, and 1 mol/l $LiBF_4$/propylene carbonate as an electrolytic solution.

The cell was charged at a constant current of 0.5 mA until the potential of the polyaniline electrode plate reached 4 V relative to lithium, and discharged at a constant current of 0.5 mA until the potential reached 2 V ralative to lithium. The discharge capacity density was 170 AH/kg.

EXAMPLE 7

The procedures of Example 6 were repeated except that the reduction treatment with a reducing agent was eliminated but after the electrochemical reduction the polyaniline was washed with ion exchange water and then treated with methanol. There was obtained about 41 mg of polyaniline (0.9 mm).

The polyaniline was used to construct a cell in a similar manner as in Example 6. The discharge capacity density of the resultant cell was measured as in Example 6 and found to be 141 AH/kg.

EXAMPLE 8

The procedures of Example 6 were repeated except that the methanol treatment was eliminated and that after the electrochemical reduction the polyaniline was washed with ion exchange water, treated with the reducing agent and dried under vacuum. There was obtained about 36 mg of polyaniline (0.8 mm).

The polyaniline was used to construct a cell and the discharge capacity density of the cell was measured as in Example 6. The discharge capacity density was 149 AH/kg.

EXAMPLE 9

The procedures of Example 6 were repeated except that the methanol treatment was replaced by a washing treatment with ion exchange water. There was obtained about 41 mg of polyaniline (0.9 mm).

The polyaniline was used to construct a cell and the discharge capacity density of the cell was measured as in Example 6 and found to be 125 AH/kg.

EXAMPLE 10

The procedures of Example 6 were repeated except that the methanol treatment was replaced by washing with acetone. About 41 mg of polyaniline (0.9 mm) was prepared.

The polyaniline was used to construct a cell and the discharge capacity density of the cell was measured as in Example 6 and found to be 125 AH/kg.

EXAMPLE 11

The procedures of Example 6 were repeated except that the methanol treatment was replaced by washing with DME (dimethoxyethane). About 41 mg of polyaniline (0.9 mm) was obtained.

The polyaniline was used to construct a cell and the discharge capacity density of the cell was measured as in Example 6 and found to be 125 AH/kg.

EXAMPLE 12

An aqueous solution (0.2 l) containing 1 mol/l of aniline and 2 mol/l of $HBF_4$ was subjected to electrolytic polymerization at 20° C. and a constant current of 10 mA/cm$^2$ for 2 hours by using a platinum plate anode and a platinum cathode. Thus, a polyaniline film of 1.6 mm in thickness was obtained.

The polyaniline film was peeled from the platinum plate, washed extensively, dried and weighed. The bulk density of the film was 0.20 g/cm$^3$. This polyaniline film having a bulk density of 0.20 g/cm$^3$ was pressed under a load of 200 kg/cm$^2$ at room temperature. There was obtained a polyaniline film having a bulk density of 0.78 g/cm$^3$ and a thickness of 0.41 mm.

A cell performance test was conducted by using a button-type cell and the polyaniline film having a bulk density of 0.85 g/cm$^3$ as a positive electrode. The negative electrode used was metallic lithium. The electrolytic solution used comprised propylene carbonate containing 5 mol/l of $LiBF_4$. The solution was added in an amount of 1 ml per g of polyaniline.

The charge-discharge test was performed by charging the cell at a constant current of 1 mA until the potential of the positive electrode reached 4.0 V relative to the negative electrode and thereafter discharging the cell at a constant current of 1 mA until the potential reached 2.0 V. The discharge capacity at the fifth cycle was 119 AH per kg of polyaniline and 45 AH per kg of the total weight of the polyaniline and the electrolyte.

EXAMPLE 13

An aqueous solution (0.2 l) containing 1 mol/l of aniline and 2 mol/l of $HBF_4$ was subjected to electrolytic polymerization at 20° C. and a constant current of 10 mA/cm$^2$ for 2 hours by using a platinum plate anode and a platinum cathode. Thus, a polyaniline film of 1.6 mm in thickness was obtained. The polyaniline film was peeled from the platinum plate, washed thoroughly and dried. The weight of the dried film was measured. The bulk density was 0.20 g/cm$^3$.

A specimen of 15 mm in diameter obtained by punching the polyaniline film was dipped into a solution of 3 mol/l of $LiBF_4$ dissolved in a mixed solvent comprising equal volumes of propylene carbonate and dimethoxyethane in a glove box. The same solution was used as an electrolytic solution to construct a cell described below.

The polyaniline film impregnated with the solution was removed out and compressed to mold in a parallel plate press using an auxiliary spacer for providing a given thickness. There was obtained a pressed polyaniline film which had a bulk density of 1.00 g/cm$^3$ and a thickness of 0.32 mm and had been impregnated with the solution comprising the same electrolyte and the same solvent as used in a cell subsequently constructed.

By using the pressed polyaniline film as a positive electrode, a coin-type cell was constructed, in which a negative electrode was made of metallic lithium and a separator of polypropylene which was impregnated with a small amount of the same electrolytic solution as that impregnated in the polyaniline film is disposed between the positive and negative electrodes.

The cell was charged at a constant current of 1 mA until 4.0 V and discharged at 1 mA until 2.5 V. The discharge capacity was 6.2 mAH which corresponded to about 110 AH per kg of the polyaniline positive electrode and about 50 AH per kg of the total weight of the electrolytic solution and the electorde.

EXAMPLE 14

An aqueous solution for electrolysis comprising 5 cc of aniline, 15 cc of 42% $HBF_4$ and 30 cc of ion exchange water was added into an electrolytic cell provided with a working electrode and a counter electrode, each being made of a platinum plate having an area of 4 $cm^2$. Electrolytic polymerization was conducted at a constant current of 20 mA for 1.4 hours to obtain polyaniline.

The polyaniline was electrochemically reduced in the same solution at a reverse current of 4 mA for one hour, and then reduced with a reducing agent by dipping it into a 10% aqueous solution of hydrazine monohydrate for 12 hours. The polyaniline was then dipped in methanol for 12 hours and dried under vacuum to obtain about 36 mg of polyaniline (0.8 mm).

The resultant polyaniline had a fibrous structure as seen from the electron microscopic photograph (magnification: 1,000 times) shown in FIG. 3. The diameter of the fibers was about 0.3 $\mu$m.

The polyaniline was used as an electrode plate to construct a cell using a lithium counter electrode and 1 mol/l $LiBF_4$/propylene carbonate as an electrolytic solution.

The cell was charged at a constant current of 0.5 mA until the potential of the polyaniline electrode plate reached 4 V relative to lithium and discharged at a constant current of 0.5 mA until the potential reached 2V relative to lithium. The discharge capacity density was 170 AH/kg.

What is claimed is:

1. A polyaniline film having a thickness of 0.3 to 5 mm and a density of 0.4 to 1.1 $g/cm^3$.

2. An electric cell in which at least one electrode comprises the polyaniline film of claim 1.

3. A polyaniline film having a thickness of 0.3 to 5 mm and a density of 0.4 to 1.1 $g/cm^3$ which is prepared by the process comprising electrochemically polymerizing aniline in an electrolytic solution containing aniline and borofluoric acid to form said polyaniline film and then pressing the thus formed polyaniline.

4. A polyaniline film prepared according to claim 3, wherein said polyaniline film is further subjected to an electrochemical reduction treatment.

5. An electric cell comprising a polyaniline film according to claim 4, wherein said polyaniline film is a positive electrode.

6. An electric cell comprising a polyaniline film according to claim 4, wherein said polyaniline film is a negative electrode.

7. An electric cell comprising a polyaniline film according to claim 4, wherein said polyaniline film is both a positive electrode and a negative electrode.

8. The polyaniline film prepared according to claim 3, wherein said polyaniline is further subjected to a chemical reduction treatment.

9. An electric cell comprising a polyaniline film according to claim 8, wherein said polyaniline film is a positive electrode.

10. An electric cell comprising a polyaniline film according to claim 8, wherein said polyaniline film is a negative electrode.

11. An electric cell comprising a polyaniline film according to claim 8, wherein said polyaniline film is both a positive electrode and a negative electrode.

12. The polyaniline film prepared according to claim 3, wherein said polyaniline film is further subjected to an electrochemical reduction treatment, and then subjected to a chemical reduction treatment.

13. The polyaniline film according to claim 12, wherein said polyaniline film is further subjected to an aliphatic alcohol treatment.

14. The polyaniline film prepared according to claim 3, wherein said polyaniline film is further subjected to an aliphatic alcohol treatment by contacting the polyaniline film with said aliphatic alcohol.

15. A polyaniline film having a fibrous structure comprising polyaniline fibers randomly tangled with each other and characterized by a bulk density of from 0.4 to 1.1 $g/cm^3$.

16. The polyaniline film of claim 15 having a thickness of from 0.1 to 3 mm.

17. An electrode comprising the film of claim 16 in composite form with a metallic layer.

18. The polyaniline film of claim 15 having a thickness of from 0.3 to 2 mm.

19. An electrode comprising the film of claim 18 in composite form with a metallic layer.

20. An electric cell in which at least one electrode comprises the polyaniline film of claim 18.

21. An electrode comprising the film of claim 15 in composite form with a metallic layer.

22. An electric cell in which at least one electrode comprises the polyaniline film of claim 15.

* * * * *